No. 750,926. PATENTED FEB. 2, 1904.
C. J. WILSON.
EYEGLASS CASE.
APPLICATION FILED JAN. 24, 1903.

NO MODEL.

WITNESSES:

Columbus J. Wilson
INVENTOR

ATTORNEYS

No. 750,926. Patented February 2, 1904.

UNITED STATES PATENT OFFICE.

COLUMBUS J. WILSON, OF PITTSBURG, PENNSYLVANIA.

EYEGLASS-CASE.

SPECIFICATION forming part of Letters Patent No. 750,926, dated February 2, 1904.

Application filed January 24, 1903. Serial No. 140,436. (No model.)

*To all whom it may concern:*

Be it known that I, COLUMBUS J. WILSON, a citizen of the United States, residing at Pittsburg, in the county of Allegheny and State of Pennsylvania, have invented certain new and useful Improvements in Eyeglass-Cases; and I do hereby declare the following to be a full, clear, and exact description of the invention, such as will enable others skilled in the art to which it appertains to make and use the same.

My invention has relation to pocket-cases for eyeglasses, and has for its object to provide an eyeglass-case with means whereby the glasses contained therein may be easily and conveniently projected from the open end of the case and applied to the nose of the wearer by the use of one hand and without the necessity of touching the glasses with the fingers.

Wearers of eyeglasses frequently find it very inconvenient and annoying, when engaged in any occupation requiring the use of the left hand, as in reading or handling an object such as a book, paper, picture, and the like, to have to drop or put away the same, so as to take their glasses from the pocket-case and apply them to the nose. They also find it objectionable to handle the glasses, as is sometimes necessary, in removing them from their cases and putting them on, as such handling tends to soil and blur the glass. To obviate these difficulties, I have produced a case adapted to be contained, when the glasses are not in use or when the case itself is not being handled, in the pocket and which is provided with a sliding stirrup having a suitable knob or thumb-piece projecting through a slit in the case, the parts being so constructed and arranged that when the glasses are within the case the innermost glass or lens will rest upon or against the flange of the stirrup, and by pushing the knob or thumb-piece with the thumb of the hand holding the case the glasses will be thrust out of the case a sufficient distance to allow the nose piece or saddle to be applied to the nose.

Figure 1:
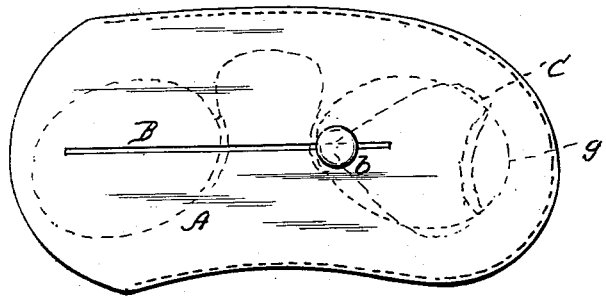
Figure 2:
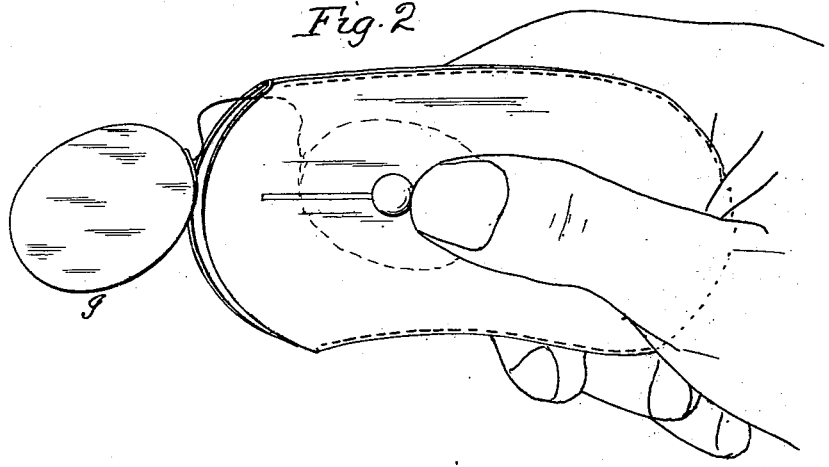
Figure 3:
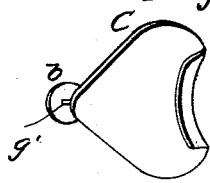

In the accompanying drawings, Figure 1 is a side view of the device embodying my invention. Fig. 2 is a perspective view of the same, showing the use and application of the case. Fig. 3 is a perspective view of the stirrup and knob or thumb-piece.

The case A may be the usual form and character of eyeglass-cases and made of leather or other material, and it may be either straight or curved, but preferably curved slightly to conform to the pitch or inclination of the lenses. A slit B is cut through one of the sides of the case a suitable distance lengthwise for the passage of the shank of a knob, button, or thumb-piece $b$, attached to a stirrup C. The stirrup C is a flat plate of thin metal of approximately heart shape or other convenient form and is bent up and formed with a slot to receive and properly hold the edge of one of the glasses or lenses $g$, as shown. The shank $g'$ of the knob or thumb-piece $b$ is preferably flattened, so as to move in the slit B without turning or wabbling. To prevent the lens which the stirrup supports from being abraded or scratched, the inner surface of the stirrup C may be covered with leather or other protective material. When the glasses are placed in the case, the stirrup is thrust back by the pressure of the glass toward the bottom of the case, or it may be moved back by hand, so as to allow the glasses to be entirely within the case.

When the glasses are to be used, the case is taken hold of by the right hand, as shown in Fig. 2, and the thumb brought back of the knob $b$. The latter is then pressed forward, thus causing the glasses to be projected slightly beyond the nose piece or saddle. This will allow of the glasses being applied to the nose without using the other hand and while the glasses are still partly within the case. As soon as the glasses are properly on the nose the case is withdrawn, thus leaving the glasses upon the nose.

My invention is applicable to any of the eyeglass-cases having an open end, and the structural parts may be modified to suit cases for different styles of nose-saddles. Such modifications are clearly within the spirit and scope of my invention and will suggest themselves to the manufacturer, so that they need not be specifically described.

Having described my invention, what I claim, and desire to secure by Letters Patent, is—

1. An eyeglass-case, having a longitudinal slit in its side and containing a stirrup, constructed and adapted to embrace the edge of one of the lenses, having a stem passing through said slit, and a thumb-piece by which the stirrup is moved.

2. The combination with the eyeglass-case, having a longitudinal slit in its side of a stirrup, consisting of a plate having one edge bent to form a flange, and slotted to receive the edge of one of the lenses, said stirrup being provided with means for moving it lengthwise, substantially as described.

In testimony whereof I affix my signature in presence of two witnesses.

COLUMBUS J. WILSON.

Witnesses:
 THOS. A. CONNOLLY,
 JNO. J. O'BRIEN.